United States Patent [19]
Haas et al.

[11] 3,876,648
[45] Apr. 8, 1975

[54] CERTAIN PYRIDINE CARBOXYLIC ACID ESTERS

[75] Inventors: Georges Haas; Alberto Rossi, both of Oberwill, Switzerland

[73] Assignee: Ciba-Geigy Corporation, Ardsley, N.Y.

[22] Filed: Apr. 4, 1973

[21] Appl. No.: 347,931

[30] Foreign Application Priority Data
Apr. 10, 1972  Switzerland.......................... 5213/72
Feb. 28, 1973  Switzerland.......................... 2920/73

[52] U.S. Cl............ 260/295.5; 260/295 R; 424/266
[51] Int. Cl............................................. C07d 31/36
[58] Field of Search .................. 260/295.5 R, 295 R

[56] References Cited
UNITED STATES PATENTS
3,557,129  1/1971  Karmas ...................... 260/295.5 R
3,786,044  1/1974  Ostermayer.................. 260/295.5 R FOREIGN PATENTS OR APPLICATIONS
427,797  1/1967  Switzerland..................... 260/295.5
268,282  2/1969  Austria ............................ 260/295.5

OTHER PUBLICATIONS
Luts et al., Journal of Pharmaceutical Sciences, Vol. 57, No. 4, pages 578–583, April 1968.

*Primary Examiner*—Alan L. Rotman
*Attorney, Agent, or Firm*—Joseph G. Kolodny; Theodore O. Groeger; John J. Maitner

[57] ABSTRACT

This invention describes new pyridine carboxylic acid esters of formula I

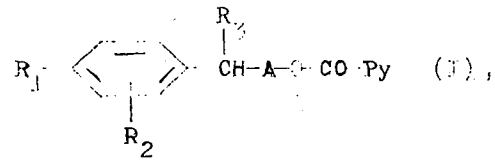

wherein $R_1$ is 1-cycloalkenyl, $R_2$ is hydrogen, lower alkyl, lower alkoxy, halogen or trifluoromethyl, $R_3$ is hydrogen, lower alkyl or cycloalkyl, A is a direct bond or methylene, or —A—O— represents —CO—CH$_2$—O— and Py is pyridyl. The compounds claimed possess an anti-inflammatory action and also an antinociceptive action and are therefore useful in particular as antiphlogistics and as non anaesthetic, peripheral analgesics.

6 Claims, No Drawings

CERTAIN PYRIDINE CARBOXYLIC ACID ESTERS

The invention relates to new pyridinecarboxylic acid esters. The invention provides new pyridinecarboxylic acid esters of the formula

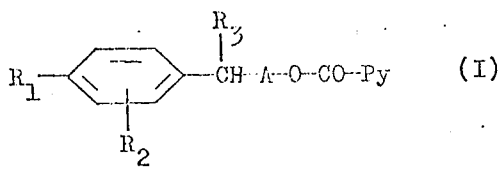

wherein $R_1$ is 1-cycloalkenyl, $R_2$ is hydrogen, lower alkyl, lower alkoxy, halogen or trifluoromethyl, $R_3$ is hydrogen, lower alkyl or cycloalkyl, A is a direct bond or methylene, or —A—O— represents —CO—CH$_2$—O—, and Py is pyridyl, and to processes for their manufacture.

Lower radicals are in particular those containing up to 7 carbon atoms, but chiefly up to four carbon atoms.

The 1-cycloalkenyl radicals represented by $R_1$ can be unsubstituted, or else they can be mono- or poly-substituted. They are for example those with four to eight, chiefly five to seven, ring members, such as optionally mono- or poly-substituted 1-cyclobutenyl or 1-cyclooctenyl radicals and, in particular, 1-cyclopentenyl, 1-cyclohexenyl, or 1-cycloheptenyl radicals. Possible substituents are amino, lower alkylamino, di-lower alkylamino, lower alkyleneamino, oxa-, thia- or aza-lower alkyleneamino, hydroxy, oxo, lower alkenyloxy and, in particular, lower alkyl and lower alkoxy.

Lower alkylamino is for example a substituent wherein lower alkyl has the meanings cited hereinbelow, such as ethylamino, n-propylamino and, in particular, methylamino.

Di-lower alkylamino is for example a substituent wherein lower alkyl has the meanings cited hereinbelow, such as diethylamino, di-n-propylamino, methylethylamino and, in particular, dimethylamino.

Lower alkyleneamino, oxa-lower alkyleneamino, thia-lower alkyleneamino, and aza-lower alkyleneamino have in particular at least two chain atoms, preferably four or five chain atoms, in the radical which substitutes the nitrogen atom.

Lower alkyleneamino is for example a substituent wherein the lower alkylene moiety is branched or, above all, straight-chain, such as hexylene-1,5, hexylene-2,5, hexylene-1,6, heptylene-1,6 and, in particular, butylene-1,4 and pentylene-1,5. Oxa-lower alkyleneamino is for example a substituent wherein oxa-lower alkylene is branched or, above all, straight-chain, such as 3-oxa-hexylene-1,6 and, in particular, 3-oxa-pentylene-1,5.

Thia-lower alkyleneamino is for example a substituent wherein thia-lower alkylene is branched or straight-chain, such as 2,4-dimethyl-3-thia-pentylene-1,5 and, in particular, 3-thia-pentylene-1,5.

Aza-lower alkyleneamino is for example a substituent wherein aza-lower alkylene is branched or straight-chain, such as 3-aza-hexylene-1,6 and, in particular, 3-azapentylene-1,5, 3-lower alkyl-3-aza-pentylene-1,5, e.g. 3-methyl-3-aza-pentylene-1,5 and 3-hydroxy-lower alkyl-3-aza-pentylene-1,5, e.g. 3-(2-hydroxyethyl)-3-aza-pentylene-1,5.

Lower alkenyloxy is for example allyloxy and methallyloxy, lower alkyl is for example methyl, ethyl, propyl, isopropyl, straigth or branched butyl, pentyl, hexyl or heptyl, which are bonded in any desired position.

Lower alkoxy is for example methoxy, ethoxy, propoxy, isopropoxy, butoxy and amyloxy. Halogen is for example fluorine, bromine and, above all, chlorine.

Cycloalkyl is for example branched, i.e., alkyl-substituted, and in particular unbranched, cycloalkyl, i.e., containing three to eight, in particular three to six ring carbon atoms, such as cycloheptyl, cyclooctyl and especially cyclopropyl, cyclobutyl, cyclopentyl, and cyclohexyl.

Pyridyl is 2-, 4- and, in particular, 3-pyridyl.

The new compounds possess valuable pharmacological properties. They have an anti-inflammatory action, as is evidence by the kaolin paw-oedema test on rats in oral administration of doses from 10 to 200 mg/kg, and also an anti-nociceptive action, as is evidenced by the phenyl-p-benzo-quinone writhing test on mice in oral administration of doses from 30 to 200 mg/kg. The new compounds are therefore useful in particular as anti-phlogistics and as non-anaesthetic, peripheral analgesics.

However, the new compounds are also valuable intermediates for the manufacture of the other useful substances, in particular of pharmacologically active compounds.

Compounds to be particularly highlighted are those of the formula I, wherein $R_2$, A and Py have the meanings given hereinbefore, $R_1$ is unsubstituted 1-cycloalkenyl and $R_3$ is hydrogen or lower alkyl.

Particularly suitable compounds are those of the formula I, wherein $R_1$ is unsubstituted 1-cycloalkenyl, $R_2$ and Py have the meanings given hereinbefore, $R_3$ is hydrogen or lower alkyl and A is methylene, or —A—O— represents —CO—CH$_2$—O—.

Of these last mentioned compounds of the formula I, particular interest attaches to those wherein $R_1$ is unsubstituted 1-cycloalkenyl, $R_2$ and Py have the meanings given hereinbefore, $R_3$ is hydrogen or lower alkyl, and A is methylene.

In the scope of the compounds, $R_2$ is preferably hydrogen and $R_1$ is preferably 1-cyclohexenyl or 1-cycloheptenyl, and $R_3$ is preferably hydrogen or methyl.

To be particularly cited are: 2-[4-(cyclohexen-1-yl)-phenyl]-1-n-propyl-picolinate, 2-[4-(cyclohexen-1-yl)-phenyl]-1-n-propyl-isonicotinate, 2-[4-(cyclohexen-1-yl)-phenyl]-1-ethyl-nicotinate, 2-oxo-3-[4-(cyclohexen-1-yl)-phenyl]-1-n-butyl-nicotinate, 2-oxo-3-[4-(cyclohexen-1-yl)-phenyl]-1-n-butyl-picolinate, 1-[4-(cyclohexen-1-yl)-phenyl]-1-ethyl-nicotinate, 2-[4-(cyclohepten-1-yl)-phenyl]-1-n-propyl-nicotinate, 2-[3-methoxy-4-(cyclohexen-1-yl)-phenyl]-1-n-propyl-nicotinate and, very particularly, 2-[4-(cyclohexen-1-yl)-phenyl]-1-n-propyl-nicotinate, which displays evidence of good anti-inflammatory action in the kaolin paw-oedema test on rats in oral administration of doses from 10 to 100 mg/kg, and a good antinociceptive action in the phenyl-p-benzoquinone writhing test on mice in oral administration of 30 to 100 mg/kg.

The new compounds are obtained by methods which are known per se.

They can therefore be obtained by reacting an alcohol which is optionally made reactive by functional modification, of the formula II

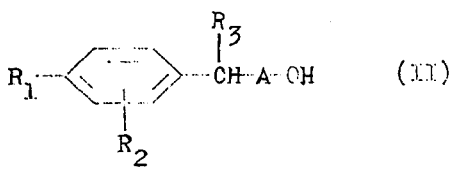

wherein $R_1$, $R_2$, $R_3$ and A have the meanings given hereinbefore, with a carboxylic acid of the formula III

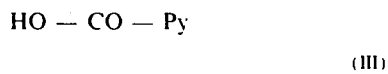

or with a reactive acid derivative thereof, wherein Py has the meaning given hereinbefore.

In a reactive, functionally modified alcohol of the formula II the OH group is, for example, a reactive esterified hydroxyl group. A reactive esterified hydroxyl group is for example a hydroxyl group which is esterified with a strong organic or inorganic acid, e.g. a halogen atom, such as chlorine, bromine, or iodine, or an arylsulphonyloxy group, such as the p-toluenesulphonyloxy group, or a xanthogenyl group, also an acyloxy group, in particular a lower alkanoyloxy group, e.g. the acetoxy group.

A reactive acid derivative of a carboxylic acid of the formula III is above all an acid halide, such as acid chloride, or an anhydride, such as an anhydride with one further mole of acid, or also a mixed anhydride, i.e., an anhydride with one mole of another carboxylic acid, e.g. a lower alkanecarboxylic acid, such as acetic acid; or also an ester, such as a lower alkyl ester or, in particular, a phenyl ester.

The reaction can take place in the usual manner. Free carboxylic acids are advantageously esterified by reaction with the alcohol, appropriately in the presence of an acid, such as a mineral acid, e.g. sulphuric acid, or hydrochloric acid, or in the presence of a water-binding agent, such as dicyclohexylcarbodiimide. However, the reaction can also be carried out by reacting the acid or a salt of the acid, e.g. an alkali metal salt, such as the sodium salt, with a reactive esterified alcohol, such as one of those cited hereinabove, for example with a halide, such as chloride or iodide, optionally in the presence of a base, such as one of those cited hereinbelow. It is possible to react acid anhydrides or acid halides e.g. with the alcohol, if desired in the presence of acid binding agents, such as organic or inorganic bases, such as amines, e.g. tertiary amines, for example triethylamine or pyridine.

Within the scope of the end product, substituents can be introduced into the resulting compounds, or existing substituents can be modified or split off.

Depending on the process conditions and on the starting materials, final products are obtained in the free form or in the form of their salts, which can be converted in the usual manner into one another or into other salts. The salts of the final products can be converted in known manner, e.g. with alkalies or ion exchangers, into the free compounds. From these free compounds salts can be recovered by reaction with organic or inorganic acids, in particular those that are suitable for the formation of therapeutically useful salts. As examples of such acids there may be cited: hydrohalic acids, sulphuric acid, phosphoric acids, nitric acid, perchloric acid; aliphatic, alicyclic, aromatic, or heterocyclic carboxylic or sulphonic acids, such as formic, acetic, propionic, succinic, glycolic acid, lactic acid, malic acid, tartaric acid, citric acid, ascorbic acid, maleic acid, hydroxymaleic acid or pyruvic acid; phenylacetic, benzoic, p-aminobenzoic, anthranilic, p-hydroxybenzoic, salicylic or p-aminosalicylic acid, embonic acid, methanesulphonic, ethanesulphonic, hydroxyethanesulphonic, ethylenesulphonic acid; halobenzenesulphonic, toluenesulphonic, naphthalenesulphonic acid or sulphanilic acid; methionine or tryptophane, lysine or arginine.

The salts can also be used for purification of the new compounds, e.g. by converting the free compounds into their salts, isolating these and converting them into the free compounds again. Because of the close relationship between the new compounds in the free form and in the form of their salts, what is stated above and hereinafter with reference to the free compounds refers also to the corresponding salts, wherever this applies.

Depending on the choice of starting materials and methods used, and depending on the number of the asymmetrical carbon atoms, the new compounds can be in the form of optical anitpodes, racemates, or of isomer mixtures (e.g. racemate mixtures).

Resulting isomer mixtures (racemate mixtures) can be resolved in known manner into the two stereoisomeric (diastereomeric) pure isomers (e.g. racemates) on the basis of the physico-chemical differences of the constituents, for example by chromatography and/or fractionated crystallisation.

Resulting racemates can be resolved by known methods, for example by recrystallisation from an optically active solvent or with the aid of microorganisms, into the diastereomers, from which the antipodes can be released by treatment with appropriate agents.

Further, by reaction with an optically active acid which forms salts with the racemate and isolation of the salts obtained in this manner, e.g. on the basis of their different solubilities, resulting racemates can be resolved into the diastereomers, from which the antipodes can be released by treatment with suitable agents. Particularly suitable optically active acids are, for example, the D- and L-forms of tartaric acid, di-o-toluyl-tartaric acid, malic acid, mandelic acid, camphorsulphonic acid, or quinic acid.

For carrying out the reactions according to the invention there are used appropriately those starting materials which lead to the groups of final products particularly mentioned at the outset, and especially to the final products which have been particularly described or highlighted.

The starting materials are known or, if they are new, can be manufactured by known methods.

The new compounds can be used for example in the form of pharmaceutical preparations which contain them in the free form or optionally in the form of their salts, in particular of the therapeutically useful salts, in admixture with a pharmaceutical organic or inorganic, solid or liquid carrier which is suitable for e.g. enteral, parenteral or topical application.

Suitable carriers are substances which do not react with the new compounds, for example water, gelatin, lactose, starch, magnesium stearate, talcum, vegetable oils, benzyl alcohol, gums, polyalkylene glycols, vaseline, cholesterol and other known medicinal carriers. The pharmaceutical preparations may be in solid form, for example tablets, coated tablets or capsules, suppositories, creams, ointments or in liquid form, for example solutions (e.g. elixir or syrup), suspensions or emulsions. They may be sterilised and/or contain assistants, such as preservatives, stabilisers, wetting agents or emulsifying agents, hydrotropic agents, salts for regulating the osmotic pressure or buffers. They may also contain other therapeutically useful substances.

The pharmaceutical preparations are obtained by conventional methods.

The following Examples illustrate the invention in more detail.

EXAMPLE 1

To 9.4 g of nicotinic acid in 100 ml of absolute acetone are added 11.4 g of triethylamine and then 12 g of crude 2-oxo-3-[4-(cyclohexen-1-yl)-phenyl]-n-butyl iodide, and the mixture is allowed to stand for 15 hours at about 20°C under anhydrous conditions. The mixture is then partitioned between 3 times 200 ml of chloroform and 200 ml of water. The combined organic phases are washed with water, then with 0.01 normal hydrochloric acid at 0°C and again with water, dried over sodium sulphate, filtered, and the filtrate is evaporated to dryness in vacuo at about 20°C. Chromatography of the residue on 500 g of silica gel with ether as eluant yields the pure 2-oxo-3-[4-cyclohexen-1-yl)-phenyl]-1-n-butyl-nicotinate of the formula

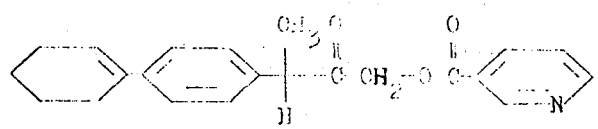

which melts at 110°-111°C (from benzene/ether/petroleum ether).

The starting material can be obtained as follows:

While stirring, 40 g of oxalyl chloride are added by small amounts at 10°C to a suspension of 24.0 g of the sodium salt of α-[4-(cyclohexen-1-yl)-phenyl]-propionic acid in 200 ml of absolute benzene. Stirring is then continued for about 12 hours at about 20°C and the reaction mixture is subsequently evaporated to dryness in vacuo at 30°C. The residue is treated with 100 ml of absolute benzene, the sodium chloride which has formed is filtered off under anhydrous conditions, and the filtrate is evaporated to dryness as described hereinabove. Distillation of the residue in a high vacuum yields the crude α-[4-(cyclohexen-1-yl)-phenyl]-propionic chloride in the fraction boiling at 115°-130°C/0.05 mm.

The following steps are carried out behind a protective shield.

While stirring, 16.9 g of the above described chloride are slowly added dropwise at −10°C and under anhydrous conditions to 200 ml of a 0.58 normal diazomethane solution in ether. The mixture is then allowed to stand for 15 hours at 5°C and subsequently evaporated to dryness in vacuo at 0°C. The crude 2-oxo-3-[4-(cyclohexen-1-yl)-phenyl]-diazobutane contained in the residue is dissolved in 100 ml of acetone and, while stirring, treated by small amounts with 200 ml of a 10% hydrochloric acid solution heated to 80°C. The reaction mixture is subsequently further stirred for 1 hour at 50°C, then cooled to about 20°C, and extracted 3 times with 200 ml of methylene chloride on each occasion. The organic phases are washed neutral, dried over sodium sulphate, filtered, and the filtrate is evaporated in vacuo. Crystallisation of the residue with petroleum ether yields the crude 2-oxo-3-[4-(cyclohexen-1-yl)-phenyl]-n-butyl chloride which melts at 66°-67°C.

To 9.9 g of the above chloride in 250 ml of absolute acetone are added 12 g of sodium iodide and the mixture is boiled for 10 hours under reflux and under anhydrous conditions. The mixture is then evaporated to dryness in vacuo at about 20°C and the residue is partitioned between 3 times 300 ml of methylene chloride and water (a small amount of sodium bisulphite is added to decolour the organic phase). The organic phases are washed with water, dried over sodium sulphate, filtered, and the filtrate is evaporated to dryness in vacuo. The residue contains the crude 2-oxo-3-[4-(cyclohexen-1-yl)-phenyl]-n-butyl iodide which is further used directly without additional purification.

EXAMPLE 2

To 10 g of 2-oxo-3-[4-(cyclohexen-1-yl)-phenyl]-n-butyl chloride, 5 g of sodium iodide and 9.4 g of picolinic acid in 100 ml of absolute dimethyl formamide are added 5.5 ml of triethylamine and the mixture is allowed to stand for 24 hours at about 20°C under anhydrous conditions. It is then treated with 1 litre of chloroform, allowed to cool to about 20°C, and the brown precipitate which has formed is filtered off. The filtrate is washed by degrees with 5 × 500 ml of water, then with saturated sodium bicarbonate solution, then with normal sodium bisulphite solution, and again with water, dried over sodium sulphate, filtered, and the filtrate is evaporated to dryness in vacuo at about 20°C. Chromatography of the residue on 400 g of silica gel with ether/ethyl acetate (1:1) as eluant yields the pure 2-oxo-3-[4-(cyclohexen-1-yl)-phenyl]-1-n-butyl picolinate of the formula

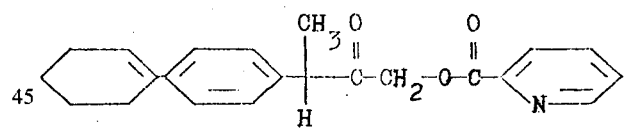

which melts at 101°-103°C (from ether/methylene chloride).

EXAMPLE 3

While stirring, 11.2 g of nicotinic chloride-hydrochloride are added by small amounts at 5°C to 9.0 g of 2-[4-(cyclohexen-1-yl)-phenyl]-propanol in 100 ml of absolute pyridine and 50 ml of absolute benzene and then 12 ml of triethylamine are added slowly. Stirring is then continued for about 12 hours at about 20°C. For processing, the reaction mixture is partitioned at 0°C between 3 × 200 ml of methylene chloride and 300 ml of water. The organic phase is washed 5 times 100 ml of water on each occasion, dried over sodium sulphate, filtered, and the filtrate is evaporated in vacuo. Crystallisation of the residue with petroleum ether yields the 2-[4-(cyclohexen-1-yl)-phenyl]-1-n-propyl nicotinate of the formula

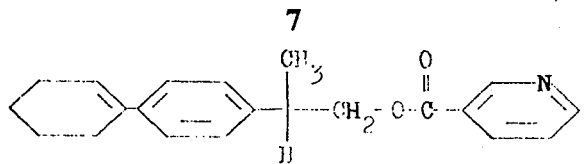

which melts at 76°–78°C.

The starting material can be obtained as follows:

While stirring, 25 g of α-[4-(cyclohexen-1-yl)-phenyl]-propionic acid methyl ester in 100 ml of absolute dioxan are added dropwise at 90°C and under anhydrous conditions to 10 g of lithium aluminium hydride in 900 ml of absolute dioxan. The mixture is then allowed to stand for a further 90 minutes at 90°C. It is cooled to 0°C, treated dropwise with 100 ml of water while stirring and filtered. The residue is thoroughly washed with dioxan. The filtrate is evaporated to dryness in vacuo. Distillation of the residue in a high vacuum yields the pure 2-[4-(cyclohexen-1-yl)-phenyl]-n-propanol in the fraction boiling at 150°C/0.1 mm.

EXAMPLE 4

While stirring, 12 g of picolinic chloride in 50 ml of absolute benzene are added dropwise at −5°C to 12.0 g of 2-[4-(cyclohexen-1-yl)-phenyl]-n-propanol in 100 ml of absolute pyridine and 50 ml of absolute benzene and subsequently 20 ml of triethylamine are also dropped in. Stirring is then continued for about 12 hours at about 20°C under anhydrous conditions. The reaction mixture is then treated with 300 g of ice and extracted 3 times with 300 ml of methylene chloride on each occasion. The organic phases are washed 6 times with 300 ml of water on each occasion, dried over sodium sulphate, filtered, and the filtrate is evaporated in vacuo. Distillation of the residue yields with the fraction boiling at 165°–170°C/0.1 mm the crude 2-[4-(cyclohexen-1-yl)-phenyl]-1-n-propyl-picolinate of the formula

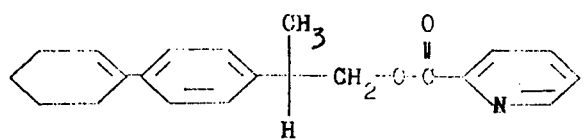

which melts at 54°–56°C after repeated crystallisation from ether/petroleum ether.

EXAMPLE 5

While stirring, 14.8 g of isonicotinic chloride-hydrochloride are added at −5°C by small amounts and under anhydrous conditions to 12.0 g of 2-[4-cyclohexen-1-yl)-phenyl]-n-propanol in 100 ml of absolute pyridine and 50 ml of absolute benzene, and subsequently 25 ml of triethylamine are added dropwise. Stirring is then continued for about 12 hours at about 20°C. The reaction mixture is then treated with 300 g of ice and extracted with 3 × 300 ml of ether. The organic phases are washed 5 times with 300 ml of water on each occasion, dried over sodium sulphate, filtered, and the filtrate is evaporated in vacuo. Crystallisation of the residue with pentane at 0°C yields the 2-[4-(cyclohexen-1-yl)-phenyl]-1-n-propyl-isonicotinate of the formula

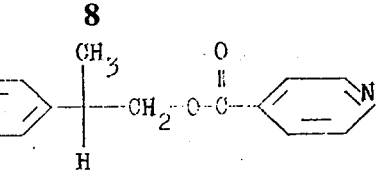

which melts at 66°–67°C.

EXAMPLE 6

While stirring, 10.7 g of nicotinic chloride-hydrochloride are added at 5°C by small amounts to 8.0 g of 2-[4-(cyclohexen-1-yl)-phenyl]-ethanol in 90 ml of absolute pyridine and 50 ml of absolute benzene, and then 20 ml of triethylamine are added dropwise. Stirring is subsequently continued for about 12 hours at about 20°C under anhydrous conditions. The reaction mixture is then treated with 300 g of water and extracted with 3 × 200 ml of methylene chloride. The organic phases are washed 5 times with 300 ml of water on each occasion, dried over sodium sulphate, filtered, and the filtrate is evaporated in vacuo. Chromatography of the residue on 300 g of silica gel with ether as eluant yields the pure 2-[4-(cyclohexen-1-yl)-phenyl]-1-ethyl-nicotinate of the formula

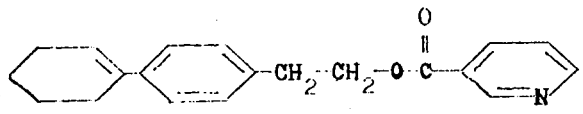

which melts at 72°–74°C (from ether-pentane).

The starting material can be obtained as follows:

A solution of 50 g of 4-(cyclohexen-1-yl)-phenylacetic acid in 400 ml of methanol and 1.5 ml of concentrated sulphuric acid is boiled under reflux for 5 hours under anhydrous conditions. The mixture is then concentrated in vacuo to a volume of about 50 ml and the residue is partitioned between 3 × 300 ml of ether and 300 g of ice water. The organic phase is washed with saturated sodium bicarbonate solution and water, dried over sodium sulphate, filtered, the filtrate is evaporated in vacuo. The residual crude 4-(cyclohexen-1-yl)-phenylacetic acid methyl ester is further processed directly.

To a suspension of 4.75 g of lithium aluminium hydride in 150 ml of absolute dioxan are slowly added at 80°C with stirring and under anhydrous conditions 11.5 of the above crude, dried ester in 50 ml of absolute dioxan. Stirring is continued for 2 hours at 80°C. Then the mixture is cooled to 0°C, 10 ml of water are slowly added dropwise, and the mixture is filtered. The filter residue is carefully washed with dioxan and the filtrate is evaporated to dryness in vacuo. The residue is distilled in a high vacuum. The fraction boiling at 130°C–135°C/0.005 mm contains the crude 2-[4-(cyclohexen-1-yl)-phenyl]-ethanol.

EXAMPLE 7

While stirring, 40 g of nicotinic chloride - hydrochloride are added at −10°C by small amounts to a solution of 15 g of 1-[4-(cyclohexen-1-yl)-phenyl]-ethanol in 100 ml of absolute tetrahydrofuran and 45 g of triethylamine, so that the temperature never rises above 5°C. Stirring is then continued for about 12 hours at about 20°C under anhydrous conditions. For processing, the reaction mixture is partitioned between 3 × 300 ml of ether and water. The organic phase is washed three times with 300 ml of water on each occasion, dried over sodium sulphate, filtered, and the filtrate is evaporated to dryness in vacuo. Distillation of the residue in a high vacuum yields in the fraction boiling at 195°–200°C/0.15 mm the 1-[4-(cyclohexen-1-yl)-phenyl]-1-ethyl-nicotinate of the formula

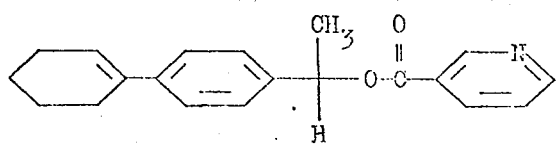

EXAMPLE 8

While stirring, 11.2 g of nicotinoyl chloride hydrochloride are added dropwise at 5°C and under anhydrous conditions to a solution of 10.0 g of 2-[4-(cyclohepten-1-yl)-phenyl]-propan-1-ol in 110 ml of absolute pyridine and 55 ml of benzene, and subsequently 13 ml of triethylamine are dropped in. Upon completion of the addition stirring is continued overnight at room temperature. The reaction mixture is then partitioned between 3 × 200 ml of methylene chloride and 3 × 300 ml of water. The organic phases are washed five times with 300 ml of water on each occasion, dried over sodium sulphate and evaporated in vacuo. Distillation of the residue in a high vacuum yields in the fraction boiling at 190°–195°C and 0.05 Torr the 2-[4-(cyclohepten-1-yl)-phenyl]-propyl-1-nicotinate of the formula

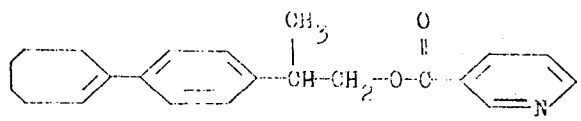

Starting from α-[4-(cyclohepten-1-yl)-phenyl]-propionic acid methyl ester it is possible to obtain the starting material analogous to the method described in Example 3.

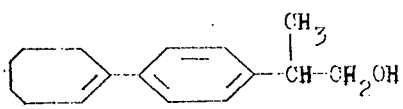

b.p. about 150°C/0.03 mm.

EXAMPLE 9

2-[3-methoxy-4-(cyclohexen-1-yl)-phenyl]-1-n-propyl-nicotinate of the formula

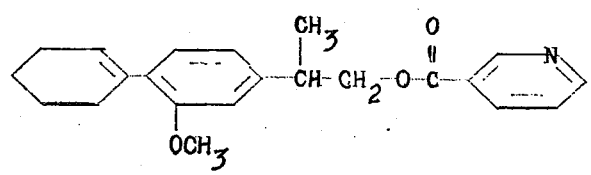

is obtained in analogous manner.

EXAMPLE 10

Tablets containing 20 mg of 2-[4-(cyclohexen-1-yl)-phenyl]-1-n-propyl-nicotinate can be manufactured in the following composition:

| Composition | per tablet |
|---|---|
| active substance | 20.0 mg |
| wheat starch | 45.0 mg |
| lactose | 60.0 mg |
| colloidal silicic acid | 5.0 mg |
| talcum | 9.0 mg |
| magnesium stearate | 1.0 mg |
| | 140.0 mg |

MANUFACTURE

The active substance is mixed with a portion of the wheat starch, with the lactose and colloidal silicic acid and the mixture is passed through a sieve. A further portion of the wheat starch is pasted on a water bath with the 5 fold amount of water and the powder mixture is kneaded with the resulting paste until a slightly plastic mass is obtained. This mass is forced through a sieve (mesh size about 3 mm), dried, and the dry granules are passed a sieve. The remainder of the wheat starch, the talcum and magnesium stearate are then admixed, and the resulting mixture is pressed into tablets each weighing 140 mg.

We claim:

1. A pyridinecarboxylic acid ester of the formula I

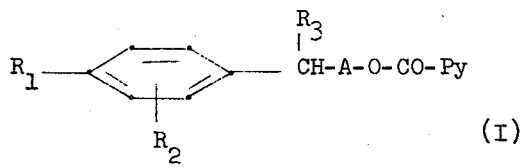

wherein $R_1$ is 1-cycloalkenyl with four to eight ring-members or such 1-cycloalkenyl mono-substituted by alkyl or alkoxy with up to four carbon atoms, $R_2$ is hydrogen, alkyl or alkoxy with up to four carbon atoms, fluorine, chlorine, bromine or trifluoromethyl, $R_3$ is hydrogen, alkyl with up to four carbon atoms or cycloalkyl with three to six ring carbon atoms, A is a direct bond or methylene, or —A—O— represents —CO—CH$_2$—O—, and Py is unsubstituted pyridyl, or a salt thereof derived from a therapeutically useful acid.

2. A compound of the formula I as claimed in claim 1, wherein $R_2$, A and Py have the meanings given hereinbefore, $R_1$ is unsubstituted 1-cycloalkenyl with five to seven ring members and $R_3$ is hydrogen or alkyl with up to four carbon atoms, or a salt thereof derived from a therapeutically useful acid.

3. A compound of the formula I as claimed in claim 1, wherein $R_1$ is unsubstituted 1-cycloalkenyl with five to seven ring members, $R_2$ and Py have the meanings given hereinbefore, $R_3$ is hydrogen or alkyl with up to four carbon atoms and A is methylene, or —A—O— represents —CO—CH$_2$—O—, or a salt thereof derived from a therapeutically useful acid.

4. A compound of the formula I as claimed in claim 1, wherein $R_1$ is unsubstituted 1-cycloalkenyl with five to seven ring members, $R_2$ and Py have the meanings given hereinbefore, $R_3$ is hydrogen or alkyl with up to four carbon atoms, and A is methylene, or a salt thereof derived from a therapeutically useful acid.

5. A compound of the formula I as claimed in claim 1, wherein $R_2$ is hydrogen and $R_1$ is 1-cyclohexenyl or 1-cycloheptenyl, and $R_3$ is hydrogen or methyl, or a salt thereof derived from a therapeutically useful acid.

6. A compound as claimed in claim 1, being a member of the group consisting of 2-[4-(cyclohexen-1-yl)-phenyl]-1-n-propyl-picolinate, 2-[4-(cyclohexen-1-yl)-phenyl]-1-n-propyl-isonicotinate, 2-[4-(cyclohexen-1-yl)-phenyl]-1-ethyl-nicotinate-2-oxo-3-[4-(cyclohexen-1-yl)-phenyl]-1-n-butyl-nicotinate, 2-oxo-3-[4-cyclohexen-1-yl)-phenyl]-1-n-butyl-picolinate, 1-[4-(cyclohexen-1-yl)-phenyl]-1-ethyl-nicotinate, 2-[4-cyclohepten-1-yl)-phenyl]-1-n-propyl-nicotinate or a salt of said members derived from a therapeutically useful acid, 2-[3-methoxy-4-(cyclohexen-1-yl)-phenyl]-1-n-propyl-nicotinate and 2-[4-(cyclohexen-1-yl)-phenyl]-1-n-propyl-nicotinate.

* * * * *

UNITED STATES PATENT OFFICE
CERTIFICATE OF CORRECTION

PATENT NO. : 3,876,648
DATED : April 8, 1975
INVENTOR(S) : Georges Haas et al

It is certified that error appears in the above—identified patent and that said Letters Patent are hereby corrected as shown below:

Column 12, lines 3-5, "or a salt of said members derived from a therapeutically useful acid" should be deleted therefrom and inserted after "nicotinate" on line 7.

Signed and Sealed this

Sixth Day of July 1976

[SEAL]

Attest:

RUTH C. MASON
*Attesting Officer*

C. MARSHALL DANN
*Commissioner of Patents and Trademarks*